No. 691,042. Patented Jan. 14, 1902.
B. L. & W. P. BRINTON.
PISTON VALVE FOR AIR COMPRESSORS.
(Application filed Apr. 23, 1901.)
(No Model.)
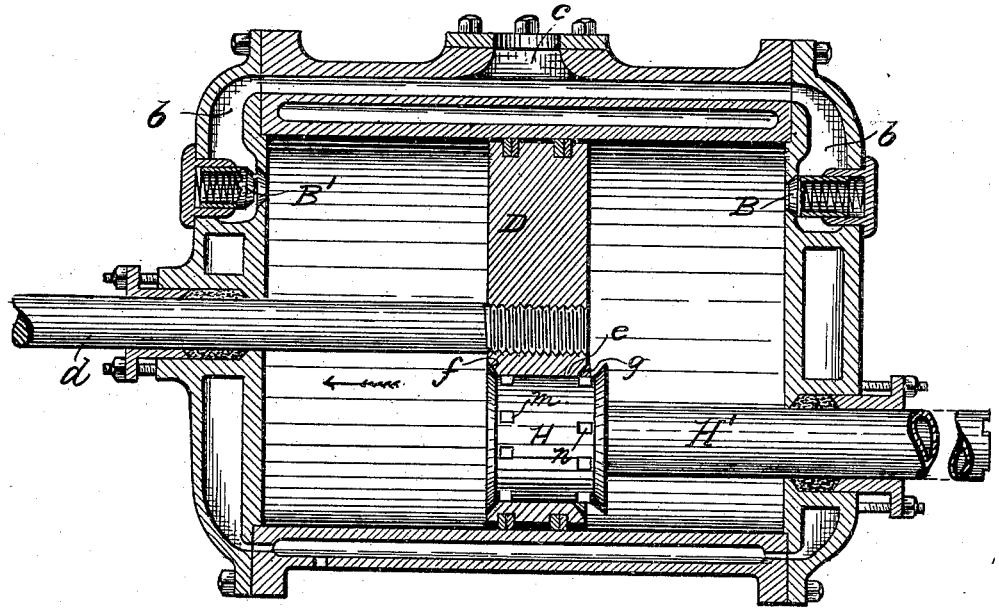
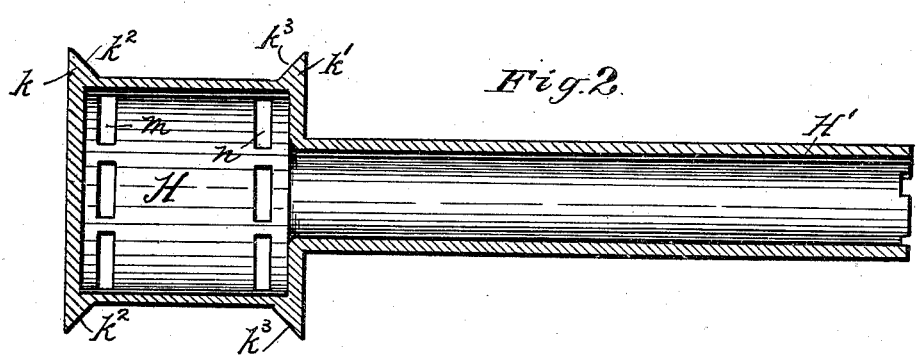

UNITED STATES PATENT OFFICE.

BURTWIN L. BRINTON AND WILLIAM P. BRINTON, OF BRADFORD, PENNSYLVANIA.

PISTON-VALVE FOR AIR-COMPRESSORS.

SPECIFICATION forming part of Letters Patent No. 691,042, dated January 14, 1902.

Application filed April 23, 1901. Serial No. 57,073. (No model.)

*To all whom it may concern:*

Be it known that we, BURTWIN L. BRINTON and WILLIAM P. BRINTON, residents of Bradford, Pennsylvania, have invented a new and useful Improvement in Piston-Valves for Air-Compressors and Analogous Apparatus, which invention is fully set forth in the following specification.

The invention relates to valves particularly designed to operate in conjunction with the pistons of air-compressors, but adapted for use generally in conjunction with the pistons of double-acting pumps whether used for pumping liquids or for compressing gas or air, our principal objects being to provide a valve which shall be positive and efficient in action whether the piston reciprocates in a vertical or horizontal direction, simple and cheap in construction, and which shall have no minor moving parts or springs.

Our improvement consists of a perforated valve adapted to have a limited sliding movement in an opening through the piston and provided with two oppositely-arranged seats thereon adapted, respectively, to be brought into engagement with two corresponding seats on the piston when said valve reaches the limit of its movement in either direction relative to the piston and a hollow or tubular stem on the valve extending through one end of the piston and communicating through the perforation or perforations in the valve with the interior of the cylinder on one side or the other of the piston, according to the position of the valve. Every time the direction of travel of the piston is reversed there is a certain amount of lost motion between the valve and piston, and hence a change in the relative position of these parts sufficient to close the ends of the perforations leading into the cylinder on one side of the piston and open the previously-closed ends of the perforations leading to the other side of the piston, one seat on the valve having been brought into contact with its corresponding seat on the piston and the other seat on the valve having moved away from contact with its seat on the piston.

While the improved valve is designed particularly as an inlet-valve for the gas, air, or liquid that is to be compressed or pumped, it may with obvious changes be employed as an outlet-valve without departing from the nature and principle of the invention.

The invention will be best understood by reference to the accompanying drawings, wherein—

Figure 1 is a longitudinal section through the cylinder and piston of an air-compressor equipped with a valve embodying our invention, and Fig. 2 is a longitudinal sectional view through the valve and its stem.

A is a cylinder having a water-jacket thereabout.

B B' are outlet-valves at opposite ends of the piston, leading to outlet-passages $b$ $b$, which merge into a single large outlet-passage $c$, leading to any suitable storage-receptacle or point of distribution.

D is the piston, receiving motion through piston-rod $d$. A cylindrical opening $e$, extending entirely through the piston, is flared or countersunk at its opposite extremities, forming seats $f$ and $g$.

H is the valve in the form of a hollow cylinder closed at one end and at its other end communicating with the interior of a hollow or tubular valve-stem H', which is securely united with the valve. Valve-stem H' extends to the exterior of the cylinder through an opening at one end thereof, being surrounded by a stuffing-box, which forms a tight joint, while permitting the stem to slide longitudinally as it partakes of the movement of the piston. The outer end of the valve-stem opens into the atmosphere, although, as is apparent, it may be connected with any suitable gas or liquid supply. The valve-stem may be extended through openings at both ends of the cylinder.

At the ends of the valve H are circumferential flanges $k$ $k'$, the inner surfaces $k^2$ $k^3$ of the flanges being inclined to fit the inclined seats $f$ $g$, respectively, and the outer surfaces of the flanges being flush with the end surfaces of the valve, respectively.

Through the circumferential wall of valve H and adjacent to the flanges $k$ $k'$ are two series of openings $m$ $n$, respectively, through which air is admitted to one side or the other of the piston, according to the direction of movement thereof and the position of the valve. As shown in Fig. 1, the piston is traveling in the direction of the arrow, (to the left,) the seat $k$ on the valve is in contact with seat $f$ on the piston, and air is being drawn into the cylinder on the right of the piston through the hollow valve-stem H', valve H, and openings $n$, which are uncovered. The openings $m$ being covered no compressed air is allowed to escape from the left side of the piston except through valve B'. Upon a reversal of the direction of movement of the piston there is a certain amount of lost motion between the piston and valve sufficient to bring seat $k^3$ into contact with seat $g$, covering openings $n$ and uncovering openings $m$, the piston now forcing compressed air out through valve B and drawing in air to the left-hand side of the piston through openings $m$. It is to be noted that during the movement of the piston to the left the left-end surface of the valve is flush with the corresponding surface of the piston and that likewise as the piston moves to the right the right-end surface of the valve is flush with the corresponding surface of the piston. The advantage of this is that no projections are offered which would limit the stroke of the piston and no depressions formed which would prevent complete exhaustion of the compressed air.

The air-compressor herein described may be operated either in a horizontal, vertical, or inclined position. When in an inclined or vertical position, the valve is supported momentarily at each reversal of the piston by the friction of the valve-stem in its stuffing-box, this permitting the valve to change its position in the opening through the piston. In the absence of any means for thus momentarily supporting the valve the apparatus would not operate in an upright position, as the valve would always remain in one position.

What we claim is—

1. In an air-compressor or analogous apparatus, a cylinder, a piston working in said cylinder, a piston-rod rigidly connected to the piston for operating the same, a valve traveling with and moved by the piston but having a limited movement in an opening therein whereby the position of the valve is changed at each reversal of the direction of travel of the piston, and a hollow stem on and movable with the valve working through an opening in one end of the cylinder and adapted to communicate with the interior of the cylinder on one side or the other of the piston according to the position of the valve relative to the piston.

2. In an air-compressor or analogous apparatus, a cylinder, a piston working in said cylinder, a piston-rod rigidly connected to the piston for operating the same, a perforated valve having two oppositely-arranged seats or stops thereon and adapted to have a limited sliding movement in the piston to bring one or the other of said seats or stops into contact with a corresponding seat or stop on the piston thereby opening the perforations through the valve first to the interior of the cylinder on one side of the piston and then to the interior of the cylinder on the other side of the piston, according to the direction of travel of the piston, and a hollow stem on and movable with the valve and working through an opening in one end of the cylinder.

3. In an air-compressor or analogous apparatus, a cylinder, a piston having an opening therethrough enlarged at its opposite ends, a perforated valve traveling with the piston but having a limited movement in the opening therein, whereby the position of the valve is changed at each reversal in the direction of travel of the piston, a seat or stop at each end of the valve adapted to engage in the enlarged ends respectively of the opening through the piston, and a hollow stem on and movable with the valve working through an opening in one end of the cylinder and adapted to communicate with the interior of the cylinder on one side or the other of the piston according to the position of the valve relative to the piston.

In testimony whereof we have signed this specification in the presence of two subscribing witnesses.

BURTWIN L. BRINTON.
WILLIAM P. BRINTON.

Witnesses:
C. C. MELVIN, 2d,
T. J. MELVIN, Jr.